(12) United States Patent
Marino

(10) Patent No.: US 6,459,174 B1
(45) Date of Patent: Oct. 1, 2002

(54) PROTECTION CIRCUIT FOR REDUCING NOISE RECEIVED AT A CIRCUIT OPERATING ON A VOLTAGE REFERENCE SUPPLY

(75) Inventor: Filippo Marino, Tremestieri Etneo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/578,259

(22) Filed: May 24, 2000

(30) Foreign Application Priority Data

May 28, 1999 (IT) .......................................... TO99A0453

(51) Int. Cl.[7] ................................................ G05B 13/00
(52) U.S. Cl. ........................ 307/125; 307/130; 307/131
(58) Field of Search ................................ 307/116, 125, 307/130, 131, 139, 70, 23; 327/551

(56) References Cited

U.S. PATENT DOCUMENTS 4,682,045 A * 7/1987 Amazawa et al. .......... 307/125
5,311,087 A * 5/1994 Suganuma ................... 307/520

* cited by examiner

Primary Examiner—Fritz Fleming
(74) Attorney, Agent, or Firm—Lisa K. Jorgenson; David V. Carlson; Seed IP Law Group, PLLC

(57) ABSTRACT

The protection circuit includes a reference voltage source and at least one circuit which are connected together via a switch. A memory element is connected to the input of the circuit, downstream of the switch. The switch is temporarily opened by a control signal generated by a monostable circuit when detecting switching of power elements belonging to an electronic device embedding the protection circuit. When the switch is open, the memory element supplies the circuit with the reference voltage previously stored. In this way, switching of the power element that might cause noise on the reference voltage cannot disturb the circuit and thereby cannot cause a faulty operation of the latter.

21 Claims, 3 Drawing Sheets

US 6,459,174 B1

PROTECTION CIRCUIT FOR REDUCING NOISE RECEIVED AT A CIRCUIT OPERATING ON A VOLTAGE REFERENCE SUPPLY

TECHNICAL FIELD

The present invention refers to a circuit for reducing the noise on a circuit that may come from voltage references, in particular in dc-dc converters.

BACKGROUND OF THE INVENTION

It is known that in some types of circuits, such as in switching regulators, the reference voltages are subject to noise due to switching of power devices.

For a better comprehension of this problem, consider for example the case of a known dc-dc converter of the step-down type usable as voltage regulator, as illustrated in FIG. 1. The dc-dc converter 1 has an input terminal 2, set, during use, at an input voltage $V_{IN}$, and an output terminal 4 supplying an output voltage $V_{OUT}$ lower than the input voltage $V_{IN}$.

The dc-dc converter 1 further comprises a switch 6, typically a power transistor of bipolar or P-channel or N-channel MOSFET type, the opening and closing whereof is controlled by a drive circuit 10. In particular, the switch 6 has a first terminal connected to the input terminal 2 of the dc-dc converter 1 and a second terminal connected, via a diode 12, to ground.

The dc-dc converter 1 further comprises an inductor 16 connected between the second terminal of the switch 6 and the output terminal 4; a capacitor 18 connected between the output terminal 4 and ground; and a voltage divider 20, comprising two resistors 22, 24 and connected between the output terminal 4 and ground; the voltage divider 20 has a tap 26 supplying a divided voltage $V_{FB}$ which is proportional, through the dividing ratio, to the output voltage $V_{OUT}$ supplied by the dc-dc converter 1.

The dc-dc converter 1 further comprises a differential voltage error amplifier (VEA) 28, which supplies at the output an intermediate voltage $V_M$ as a function of the difference between the divided voltage $V_{FB}$ and a reference voltage $V_{REF}$.

The intermediate voltage $V_M$ and a comparison voltage $V_C$ supplied by an oscillator 32 and having a saw-tooth waveform with preset frequency are supplied at input to a differential comparator 30 of a pulse-width modulator (PWM) type, which, in turn, generates at the output a control signal $V_P$ supplied at input to the drive circuit 10 of the switch 6.

The PWM comparator 30 acts substantially as a Pulse-Width Modulator and outputs a voltage having a square waveform the duty-cycle of which is a function of the voltage supplied by the voltage-error amplifier 28, and the frequency of which depends on the frequency of the comparison voltage $V_C$ supplied by oscillator 32.

The dc-dc converter 1 has the problem that switching-on and switching-off of the power switch 6 may cause noise, for example on the reference voltage $V_{REF}$ and on the supply voltage. This noise may even be considerable and may jeopardize the precision and proper operation of the circuit, for example causing undesirable switching of the components, in particular in the case of multiple switches. It is known, in fact, that in individual switches the noise may interfere with the leading and trailing edges of the control voltage $V_P$ at the output of the PWM comparator 30, and, in addition, the leading edges of the control voltage $V_P$ itself are synchronous with the clock signal CK supplied to the oscillator 32. Consequently, for any switch, at each clock cycle it is possible to temporarily block the output of the PWM comparator 30 (by means of a monostable circuit) for a time sufficient to allow the noise causing transient phenomena to settle to a steady-state condition. In addition, the logic devices for circuit control store the trailing edge of the voltage signal at the output of the PWM comparator 30 and block the value of the control voltage $V_P$ until the next clock cycle. In this way, erroneous switchings are prevented, even though the problem of having noisy voltage references is not eliminated.

In the case of multiple switches, which comprise a number of PWM comparators, it is possible to mask only the leading edges, which are synchronous with the clock signal, of the signals coming from the comparators themselves. The trailing edges, instead, are not temporarily correlated with one another, and hence it may occur that a disturbance due to the correct switching of a comparator causes undesirable switching of other comparators.

Similar problems may arise also in other types of devices where, in general, switching of power elements causes noise on the used reference lines.

SUMMARY OF THE INVENTION

The aim of the present invention is to provide a circuit for protecting an operating circuit from noise on a voltage supply line.

According to the present invention, an electronic device is provided, comprising a voltage generating circuit outputting a reference voltage, at least one operating circuit having an input terminal connected to said voltage generating circuit, and a noise protection circuit that detects events linked to noise conditions. The noise protection circuit having a switch connected between said input terminal and said voltage generating circuit and having a control terminal and voltage memory circuit connected to said input terminal, said control terminal receiving a control signal activated by said noise conditions to cause alternately opening and closing of the switch.

BRIEF DESCRIPTION OF THE DRAWINGS

For a better understanding of the invention, an embodiment thereof is now described purely to provide a non-limiting example, with reference to the attached drawings, in which.

DETAILED DESCRIPTION OF THE INVENTION

Figure 1:
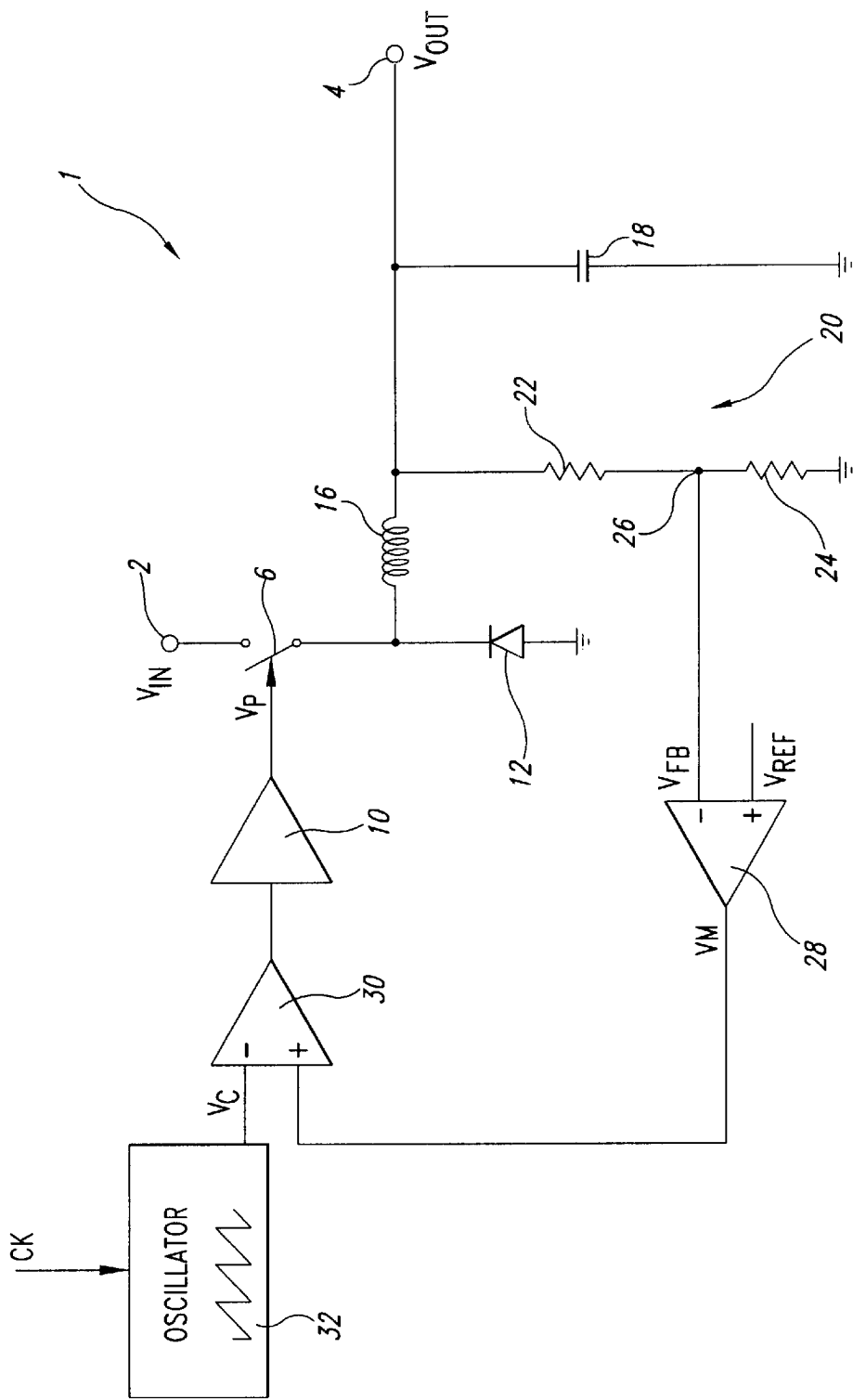
FIG. 1 presents a simplified diagram of a dc-dc converter circuit of a known type.
Figure 2:
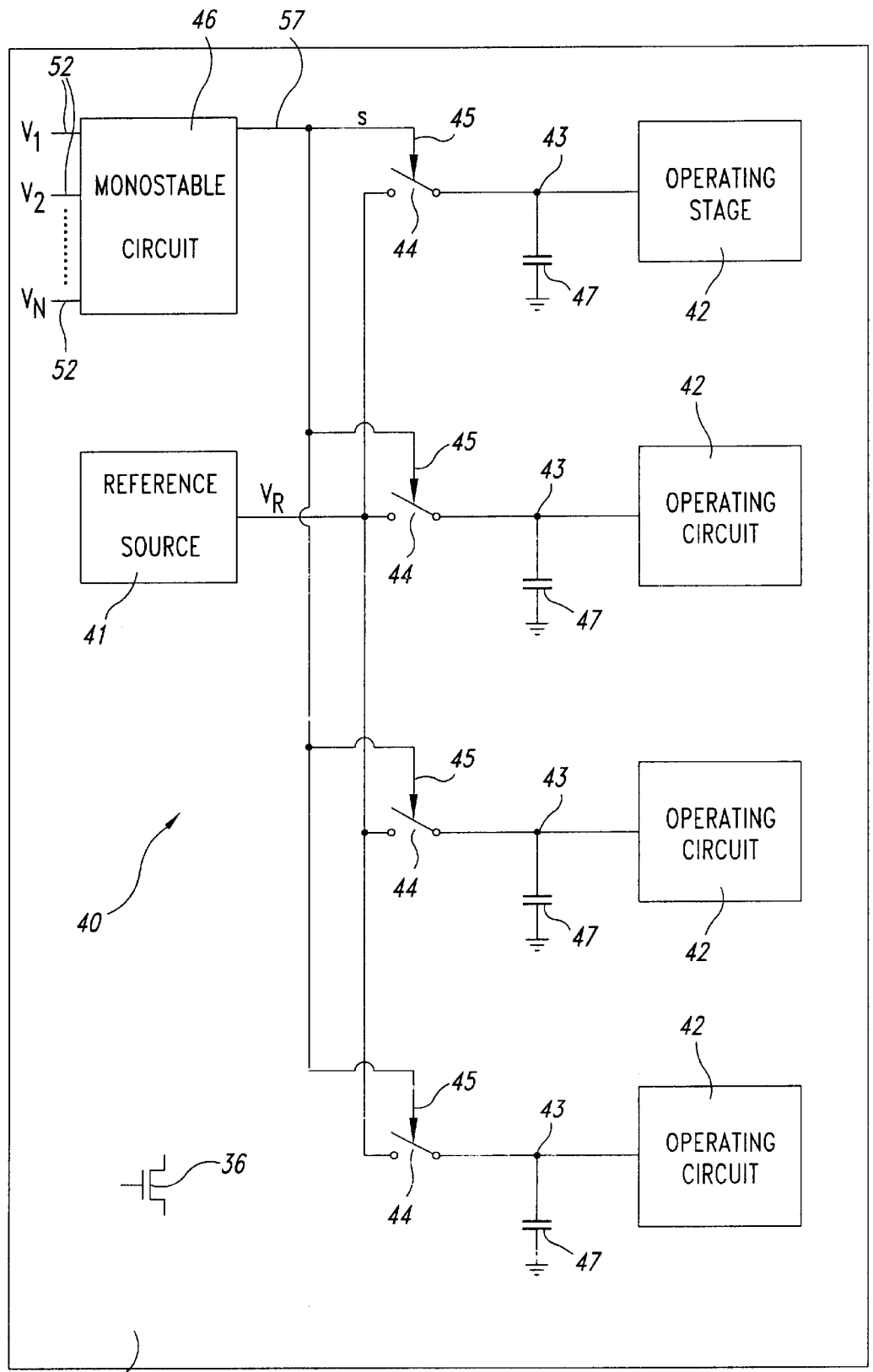
FIG. 2 presents a simplified block diagram of a circuit according to the present invention.

As shown in FIG. 2, a protection circuit 40 is part of an electronic device 35 for protecting an operating circuit from noise on a voltage supply line. The device 35 includes power switches, here represented by a MOS transistor 36, switching which of may give rise to noise. The switching transistor 36 corresponds to switch 6 of FIG. 1 in one embodiment.

The protection circuit 40 is to shield noise from a reference voltage source 41 from a plurality of operating circuits 42, sensitive to the noise. One of the circuits 42 may be, for instance, a differential voltage error amplifier, such as the amplifier 28 shown in FIG. 1. The reference voltage source 41 supplies a reference voltage $V_R$ (which may be disturbed by the switching of the power elements, for instance by the MOS transistor 36) and is connected to an input terminal 43 of each device 42 through a plurality of switches 44, one for each operating circuit 42, each of the said switches 44 being conveniently formed by a MOS-type or bipolar transistor.

The electronic device 35 receives operating power from a voltage reference source 41, having an output $V_R$. The signal $V_R$ of FIG. 2 may correspond to the voltage $V_{REF}$ at the input of amplifier 28 of FIG. 1. It may also represent a voltage output at terminal 4, $V_{OUT}$ of FIG. 1, or from some other source. It is understood that the voltage supply signal $V_R$ may have noise at various times and it is desired to shield operating circuits 42 from this noise. One source of the noise might be transients caused by switching of power transistors 36 within the reference source 41. The noise may be from some other source also. In one embodiment, the entire device 35 is the dc-dc converter of FIG. 1 and the operating circuits 42 correspond to amplifiers 28, 30 and inverter 10. It is, of course desired that these circuits also be shielded from noise on their power supply and voltage reference inputs caused by noise spikes due to the switching of transistor 6, in FIG. 1 as well as from some other source. The circuits 42 may also be counters, clock circuits, multiplexers, or any other circuit that operates based on a power supply or a reference voltage.

The switches 44 have their respective control terminals 45 all connected to an output terminal 57 of a monostable circuit 46 having a plurality of inputs 52 to which logic signals $V_1, V_2, \ldots, V_N$ are supplied. The monostable circuit 46 generates a control signal S on the output terminal 57 to control alternately closing and opening of the switches 44.

The logic signals $V_1, V_2, \ldots, V_N$ are correlated, in a known way, to the noise caused on the reference voltage $V_R$ by switching power elements (for example, the MOS transistor 36). For example, one of the signals $V_1, V_2, \ldots, V_N$ may be the control signal VP of the MOS transistor 36. In particular, the noise may arise at instants corresponding to the leading edges and/or trailing edges of the logic signals $V_1, V_2, \ldots, V_N$; the edges linked to the noise will be indicated hereinafter as "active edges".

The protection circuit 40 further comprises a plurality of memory elements represented, for instance, by capacitors 47, one for each circuit 42. In detail, each capacitor 47 is connected between the input terminal 43 of the respective circuit 42 and ground.

Operation of the protection circuit 40 is the following.

The monostable circuit 46 has a stable state wherein control signal S is in a first logic state (for example, low) and controls closing of the switches 44. As a result, in the stable state, the input terminals 43 of the circuits 42 are connected to the reference voltage source 41 and receive the reference voltage $V_R$. Furthermore, the capacitors 47 remain charged at the reference voltage $V_R$.

When at least one of the inputs 52 has an active edge, the monostable circuit 46 switches to an activated state and sends the control signal S at the output terminal 57 into a second logic state (for example, high) which causes opening of the switches 44 for an opening time TD. During this time interval, the reference voltage source 41 may be subject to noise and cause fluctuations in the reference voltage $V_R$, but is disconnected from the circuits 42 and hence does not affect their proper operation. In this phase, the capacitors 47, which operate as a local voltage reference, keep the input terminals 43 of the respective circuits 42 at the value of the reference voltage $V_R$. For this purpose, the capacitors 47 must be appropriately sized to render the discharge due to dispersion currents or to absorptions by the circuits 42 negligible. A typical capacitance value for the capacitors 47 may be, for instance 10 pF.

The opening time TD is chosen so as allow the transients linked to the switching of the power devices to settle to a steady state condition. If one of the logic signals $V_1, V_2, \ldots, V_N$ has an active edge while the monostable circuit 46 is in the activated state, the monostable circuit 46 stays in the activated state for a further time equal to TD, so prolonging the time interval in which the switches 44 remain open.

Once the opening time TD has elapsed, if none of the logic signals $V_1, V_2, \ldots _N$ has further active edges, the monostable circuit 46 spontaneously goes back into the stable state, and the control signal S again causes closing of the switches 44, thus bringing the protection circuit 40 back into the initial configuration. In particular, the capacitors 47 may restore any charge that may have been lost during opening of the switches 44.

Figure 3:
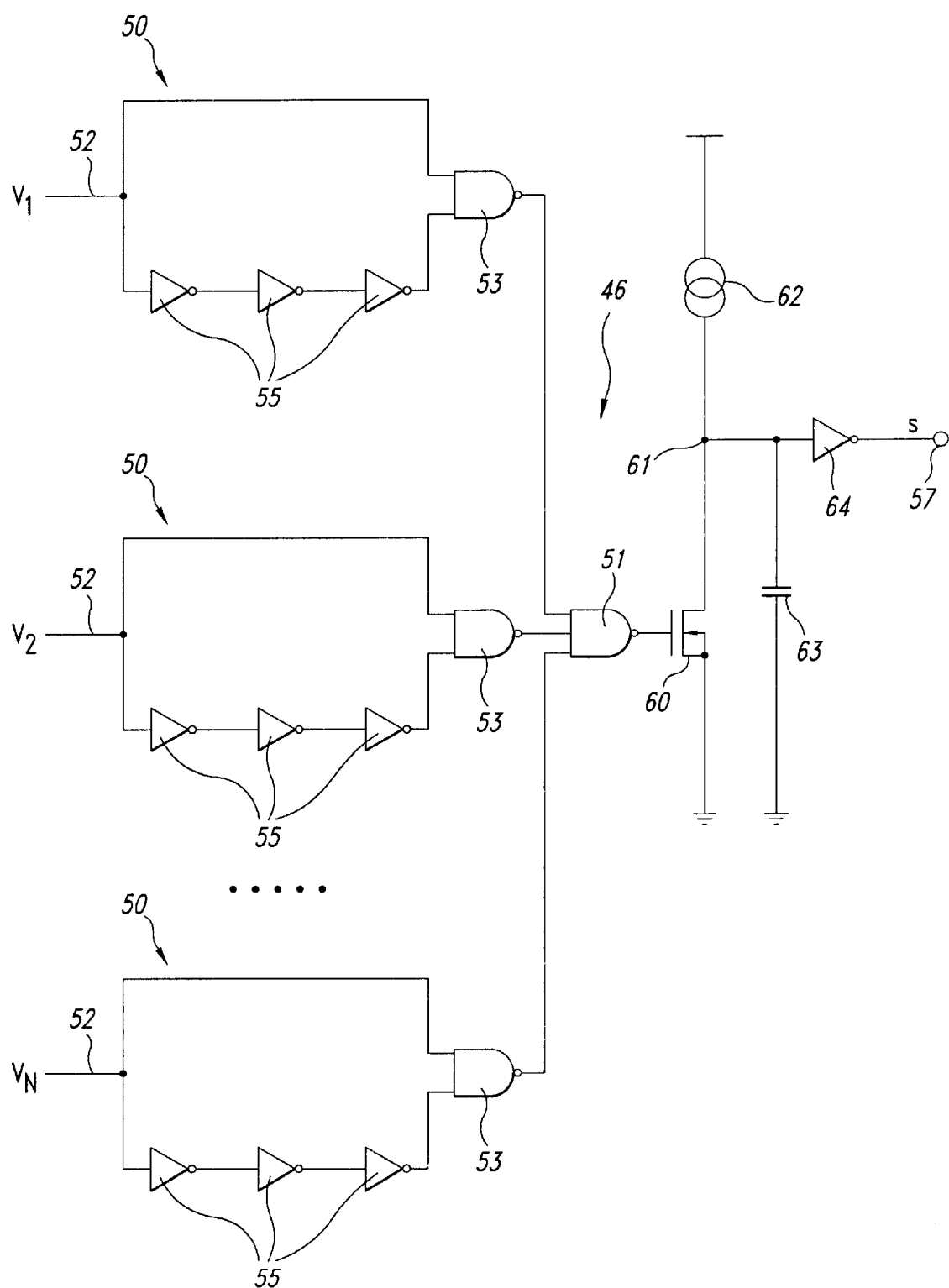
FIG. 3 presents a logic diagram of a part of the block diagram of FIG. 2.

FIG. 3 illustrates an embodiment of monostable circuit 46 comprising a plurality of branches 50 equal in number to the number of the logic signals $V_1, V_2, \ldots, V_N$, and a NAND gate 51 having inputs connected to respective outputs of the branches 50 and outputting the control signal S.

Each branch 50 receives at an own input 52 a respective one of the logic signals $V_1, V_2, \ldots, V_N$ in direct form if the active edges are leading edges and in inverted form if the active edges are trailing edges. For instance, in FIG. 3 the signal $V_1$, for which the active edges are leading edges, is supplied in direct form, whereas the signal $V_2$, for which the active edges are trailing edges, is supplied in inverted form.

In addition, each branch 50 comprises a NAND gate 53 having a first input directly connected to the input 52 of the respective branch 50 and a second input connected to the same input 52 through an odd number of cascaded inverters 55 (for instance, three).

The output of the NAND gate 51 is connected to the gate terminal of an NMOS transistor 60 having its source terminal connected to ground and its drain terminal connected to a node 61. A current source 62 is coupled between the node 61 and the supply. A capacitor 63 is connected between the node 61 and ground. Finally, an inverter 64 has its input connected to the node 61 and its output connected the output terminal 57 of the monostable circuit 46.

In this way, in presence of an active edge of the signals $V_1, V_2, \ldots, V_N$, the respective NAND gate 53 switches to low, thus causing switching of the NAND gate 51 to high. After propagation of the same active edge through the inverters 55, the same NAND gate 53 returns to the high state, and the NAND gate 51 again switches to the low state. In this way, a pulse is generated which briefly turns on transistor 60, causing discharge of the capacitor 63, which had previously been charged by the current source 62, and causing switching of the signal S at the output of the inverter 64 from the low state to the high state. The number of inverters 55 to ensure the transistor 60 is off sufficiently long to discharge capacitor 63 is selected as needed, whether one, three, five, etc. At the end of the pulse at the output of the NAND gate 51, the transistor 60 turns off again, so enabling recharging of the capacitor 63. When the voltage on the capacitor 63 reaches the voltage for triggering the inverter 64, the latter switches, and the signal S returns to the low state. In this way, the opening time TD of the monostable circuit 46 is equal to the time for charging the capacitor 63.

The length of time TD that the switch 44 is open can be easily selected by the design and various components 62 and 63. The size of capacitor 63 and the RC time constant with transistor 60 will, of course control the discharge rate. The charging rate is controlled by the amplitude of current flow from current source 62 and the size of capacitor 63. For a large current flow, the time TD will be short. For a large capacitor 63 or low current output from 62, the time TD will be longer. Thus, by selecting the value of current source 62 in conjunction with the size of capacitor 63, the open time TD of switch 44 to block the effect of noise can be selected and controlled.

The length time TD can be designed into the circuit when it is designed. In one embodiment, current source 62 is a variable output so the output value of current source 62 is selectable after the circuit is designed. For example, after the chip 35 is complete, it can be tested to determine the preferred time TD by monitoring the noise transients and length of noise. After this testing is done, the value TD can be set to a preferred value by setting the value from current source 63.

The value of capacitor 47 is preferred to be selected to ensure that the voltage of node 43 remains constant. By selecting the value of capacitor 47 based on the value of TD, the circuits 42 will always be assured of being constant. The capacitor 47 is sufficiently large that when the switch 44 is open for time TD that the voltage on node 43 stays at the same value and does not drop. The value of capacitor 47 is thus selected based on the time TD and the expected current draw from node 43 by circuit 42 during the time TD. Once switch 44 closes, power is again provided to node 43 to hold it at the correct value. The capacitor 47 is downstream from the switches 36 and 44, so the effects of their switching is filtered out.

The protection occurs in presence of an active edge of another logic signal (or of the same logic signal) $V_1$, $V_2$, ..., $V_N$, SO prolonging the time during which the monostable circuit 46 remains excited.

The protection circuit described herein has the following advantages.

First, the protection circuit according to the invention can eliminate the effects of noise even in the presence of a number of noisy elements. Only one example of which is the case of multiple dc-dc converters. In fact, whenever a power device switches, the monostable circuit 46 can be activated, and consequently the switches 44 remain open for at least a time equal to the opening time TD, irrespective of the state of the monostable circuit 46. In addition, during the opening time TD, when the switches 44 are open, a stable value equal to the reference voltage $V_R$ is supplied to the circuits 42 by the respective capacitors 47.

Furthermore, the protection circuit 40 may be used for any type of voltage reference that might be subject to disturbances due to switching of power devices. In particular, it may be exploited also for providing protection from the effect of noise on supply lines.

The protection circuit 40 may be used on circuits to filter noise from any voltage reference source, besides dc-dc converters. To improve performance, it is helpful to be able to define time windows correlated to signal transitions or states during which transient noise phenomena occur.

Finally, it is evident that modifications and variations may be made to the protection circuit described herein, without thereby departing from the scope of the present invention.

What is claimed is:

1. An electronic device comprising:
   a voltage generating circuit having an output terminal outputting a reference voltage;
   an operating circuit having an input terminal connected to said voltage generating circuit; and
   a noise protection circuit receiving a plurality of logic events predicting noise conditions, the noise protection circuit having a switching circuit coupled between said input terminal of the operating circuit and said output terminal of the voltage generating circuit and having a respective control terminal, and voltage storage circuit connected to said input terminal of the operating circuit; said control terminal receiving a control signal activated by said logic events to cause alternate opening and closing of the switching circuit to filter out a noise signal from the output terminal of the voltage generating circuit.

2. The device according to claim 1, further comprising a control means for detecting a duration of said noise conditions and switching said control signal between a first value and a second value causing, respectively, opening and closing of said switching circuit.

3. The device according to claim 2 wherein said control circuit comprises a monostable circuit.

4. The device according to claim 1 wherein said voltage storage circuit comprises a capacitive element.

5. The device according to claim 4, wherein said capacitive element comprises a capacitor connected between said input terminal and a reference potential line.

6. The device according to claim 1, further comprising a dc-dc converter including a power element having a control terminal receiving a respective control signal having active switching edges, in that said operating circuit comprises a voltage error amplifier, and in that said events linked to noise conditions comprise said active switching edges of said control signal of said power element.

7. The device according to claim 1, further including a plurality of operating circuits and in that said noise protection circuit comprises a plurality of switches, each of said switches being coupled between a respective input terminal of a respective operating circuit and said voltage generating circuit having a respective control terminal, and a plurality of voltage storage circuits connected to said input terminal of a respective operating circuit; said control terminals receiving said control signal.

8. The device according to claim 1 wherein the noise protection circuit further comprises:
   a power storage device having a first terminal coupled to the input terminal of the operating circuit, and a second terminal coupled to a second voltage;
   a voltage supply source having an output terminal coupled to the input terminal of the switching circuit;
   a control circuit coupled to the control terminal of the switching circuit, the control circuit causing the switching circuit to open to disconnect the input terminal of the operating circuit from the output terminal of the voltage supply source and to close to connect the input terminal of the operating circuit to the output terminal of the voltage supply source; and
   an input signal coupled to the control circuit and providing an indication to the control circuit to open the switching circuit when the noise signal is anticipated to be on the output terminal of the voltage supply source to isolate the input terminal of the operating circuit from the noise signal, the power storage device holding the voltage constant on the input terminal of the operating circuit while the output terminal of the voltage supply source is not connected to the input terminal of the operating circuit.

9. The device according to claim 8 wherein the control circuit maintains the switching circuit open for a selected time period and closes the switching circuit after a selected time as passed.

10. The device according to claim 9 wherein the length of the selected time period is based on the anticipate length of noise on the output terminal of the voltage supply source.

11. The device according to claim 1 wherein the operating circuit is an amplifier.

12. A noise isolation device coupled between a first and second supply voltages comprising:
   a voltage reference circuit having an output terminal;
   a switch circuit having an input, output, and control terminals wherein the input terminal is coupled to the output terminal of the voltage reference circuit;
   a capacitor circuit having an input terminal and an output terminal wherein the input is coupled to the first supply voltage and the output terminal is coupled to the output terminal of the switch circuit;
   a monostable circuit having a plurality of inputs terminals receiving logic signals predicting a plurality of noise conditions, wherein each input terminal is coupled to a first logic circuit for determining a duration of the logic signal, a second logic circuit receiving each duration of the logic signals and combining each duration of the of logic signals to provide a total duration to an output terminal indicating an opening time for the switch circuit during the noise condition coupled to the control terminal of the switch circuit; and
   a load circuit having an voltage supply input coupled to the output of the switch circuit.

13. The noise isolation device according to claim 12 wherein the switch circuit is a MOS or bipolar type transistor.

14. The noise isolation device according to claim 12 wherein the opening time of the monostable circuit is determined by an RC time constant of a discharge transistor and a capacitor.

15. The noise isolation device according to claim 12 wherein the capacitor circuit is a sufficiently large charge storage device whereby a voltage on the output of the switch circuit is constant during the opening time of the monostable circuit.

16. A noise compensation device comprising:
   a voltage reference circuit having an output;
   a switch circuit having an input, output and control wherein the input is coupled to the output of the voltage reference circuit;
   a capacitor circuit having an input and an output wherein the input is coupled to a first supply and the output is coupled to the output of the switch circuit;
   a plurality of input logic circuits having an input and an output, the input is coupled to a first and second leg, and each leg receives a logic signal having a leading and trailing edge wherein the second leg delays the trailing edge to provide the output of the input logic circuit a time duration from the leading edge to the trailing edge;
   a timing circuit having a plurality of inputs, each input coupled to the output of the input logic circuit to receive the time duration of the input logic circuit, wherein each time duration of the plurality of input logic circuits is combined to provide to the output of the timing circuit a total duration;
   a switch controller having an input and an output, the input coupled to the output of the timing circuit to receive the total duration wherein the output of the switch controller is coupled to the control of the switch circuit to provide a protection time; and
   a load circuit having an input coupled to the output of the switch circuit.

17. The noise compensation device according to claim 2 wherein the second leg of the input logic circuit further comprises a plurality of delay elements.

18. The noise compensation device according to claim 17 wherein the plurality of delay elements comprise a plurality of inverters coupled in series wherein each inverter provides an intrinsic delay.

19. The noise compensation device according to claim 18 wherein the time duration of the input logic circuit is determined by a number of inverters in the second leg.

20. The noise compensation device according to claim 16 wherein the first and second legs are coupled to a first and second input of a NAND logic circuit having an output to provide the time duration.

21. The noise compensation device according to claim 16 wherein the timing circuit is a NAND logic circuit.

* * * * *

UNITED STATES PATENT AND TRADEMARK OFFICE
CERTIFICATE OF CORRECTION

PATENT NO.     : 6,459,174 B1
DATED          : October 1, 2002
INVENTOR(S)    : Filippo Marino It is certified that error appears in the above-identified patent and that said Letters Patent is hereby corrected as shown below:

<u>Column 8,</u>
Line 31, "according to claim 2" should read as -- according to claim 16 --.

Signed and Sealed this

Twenty-ninth Day of April, 2003

JAMES E. ROGAN
*Director of the United States Patent and Trademark Office*